US011755826B2

(12) United States Patent
Shvedai et al.

(10) Patent No.: US 11,755,826 B2
(45) Date of Patent: Sep. 12, 2023

(54) SYSTEMS AND METHODS FOR CREATING AND MANAGING TABLES

(71) Applicants: Atlassian Pty Ltd., Sydney (AU); Atlassian Inc., San Francisco, CA (US)

(72) Inventors: Eduard Shvedai, Sydney (AU); Rifat Nabi, Sydney (AU); Sherif Mansour, Sydney (AU); James Rotanson, Sydney (AU); Bradley Rodgers, Sydney (AU); Alexander Neil Hixon, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 39 days.

(21) Appl. No.: 17/361,188

(22) Filed: Jun. 28, 2021

(65) Prior Publication Data
US 2021/0406457 A1  Dec. 30, 2021

Related U.S. Application Data

(60) Provisional application No. 63/046,055, filed on Jun. 30, 2020.

(51) Int. Cl.
*G06F 40/177* (2020.01)
*G06F 11/07* (2006.01)
*G06F 21/62* (2013.01)

(52) U.S. Cl.
CPC ........ *G06F 40/177* (2020.01); *G06F 11/0727* (2013.01); *G06F 11/0784* (2013.01); *G06F 21/6218* (2013.01)

(58) Field of Classification Search
CPC ............. G06F 11/0727; G06F 11/0784; G06F 16/254; G06F 21/6218; G06F 40/103; G06F 40/106; G06F 40/166; G06F 40/177
See application file for complete search history.

(56) References Cited

U.S. PATENT DOCUMENTS

| 10,394,691 | B1* | 8/2019 | Cole ..................... G06F 11/079 |
| 11,044,298 | B1* | 6/2021 | Balasubrahmanian ...................... H04W 4/50 |
| 2009/0254589 | A1* | 10/2009 | Nair ...................... G06F 16/275 |
| 2013/0007062 | A1* | 1/2013 | Dutta .................... G06F 16/215 707/E17.055 |
| 2017/0140047 | A1* | 5/2017 | Bendig ................. G06F 16/252 |

(Continued)

*Primary Examiner* — Scott T Baderman
*Assistant Examiner* — Mario M Velez-Lopez
(74) *Attorney, Agent, or Firm* — Brownstein Hyatt Farber Schreck, LLP

(57) ABSTRACT

Methods and systems for creating tables are disclosed. The method includes receiving a request to create a table, the request including an indication of a number of columns and rows for the table, generating the table, the table comprising the number of columns and rows indicated in the request, an intersection of a column and a row in the table being a cell of the table, the table further comprising a summary row; rendering the table on a client device; the table comprising a column type affordance for selecting a column type for at least one column and a summary type affordance for selecting a summary type for at least one column; receiving selection of the column type affordance for a column; applying the selected column type to each cell of the column; and updating the summary type available for the column based on selected column type for the column.

20 Claims, 8 Drawing Sheets

(56) References Cited

U.S. PATENT DOCUMENTS

| | | |
|---|---|---|
| 2019/0272315 A1 | 9/2019 | Walia et al. |
| 2019/0303446 A1 | 10/2019 | Franz et al. |
| 2020/0012656 A1* | 1/2020 | Pugh .................... G06F 16/248 |
| 2020/0202066 A1* | 6/2020 | Bodera .............. G06F 16/9558 |
| 2020/0314211 A1* | 10/2020 | Oye ....................... H04L 67/02 |
| 2021/0342785 A1* | 11/2021 | Mann .................. G06F 11/3409 |
| 2022/0229821 A1* | 7/2022 | Greenshpan ........ G06F 16/2358 |
| 2022/0311595 A1* | 9/2022 | Vukolic ................. H04L 63/12 |

* cited by examiner

SYSTEMS AND METHODS FOR CREATING AND MANAGING TABLES

CROSS-REFERENCE TO RELATED APPLICATION(S)

This application is a nonprovisional patent application of and claims the benefit of U.S. Provisional Patent Application No. 63/046,055, filed Jun. 30, 2020 and titled "Systems and Methods for Creating and Managing Tables," the disclosure of which is hereby incorporated herein by reference in its entirety.

TECHNICAL FIELD

Aspects of the present disclosure are directed to the creation and/or management of intelligent tables in electronic content.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Some document creation applications allow for use of tables in content to display data in a structured format. However, traditionally, tables have been used to represent limited types of data and are constrained based on the content creation application used to create the tables. The systems and techniques described herein are directed to the creation and/or management of tables in electronic content that may not have some of the drawbacks of traditional systems.

SUMMARY

In certain embodiments of the present disclosure a computer-implemented method for creating a table is disclosed. The method includes receiving a request to create a table. The request includes an indication of a number of columns and a number of rows for the table. The method further includes generating the table. The table including the number of columns and the number of rows indicated in the request. An intersection of a column and a row in the table being a cell of the table and the table further comprising a summary row. The method further includes rendering the table for display on a user interface of a client device, wherein the displayed table including a column type selection affordance for selecting a column type for at least one column of the table and a summary type selection affordance for selecting a summary type for at least one column of the table. The method also includes receiving selection of the column type selection affordance to select a column type for a column, applying the selected column type to each cell of the column, and updating the summary type available for the column based on the selected column type for the column.

In some further embodiments, a non-transitory computer readable medium is disclosed. The non-transitory computer-readable storage medium stores sequences of instructions, which when executed by a processing unit, cause the processing unit to: receive a request to create a table, the request includes an indication of a number of columns and a number of rows for the table; generate the table, the table including the number of columns and the number of rows indicated in the request, an intersection of a column and a row in the table being a cell of the table and the table further comprising a summary row; render the table for display on a user interface of a client device, wherein the displayed table including a column type selection affordance for selecting a column type for at least one column of the table and a summary type selection affordance for selecting a summary type for at least one column of the table; receive selection of the column type selection affordance to select a column type for a column, apply the selected column type to each cell of the column, and update the summary type available for the column based on the selected column type for the column.

Figure 1:
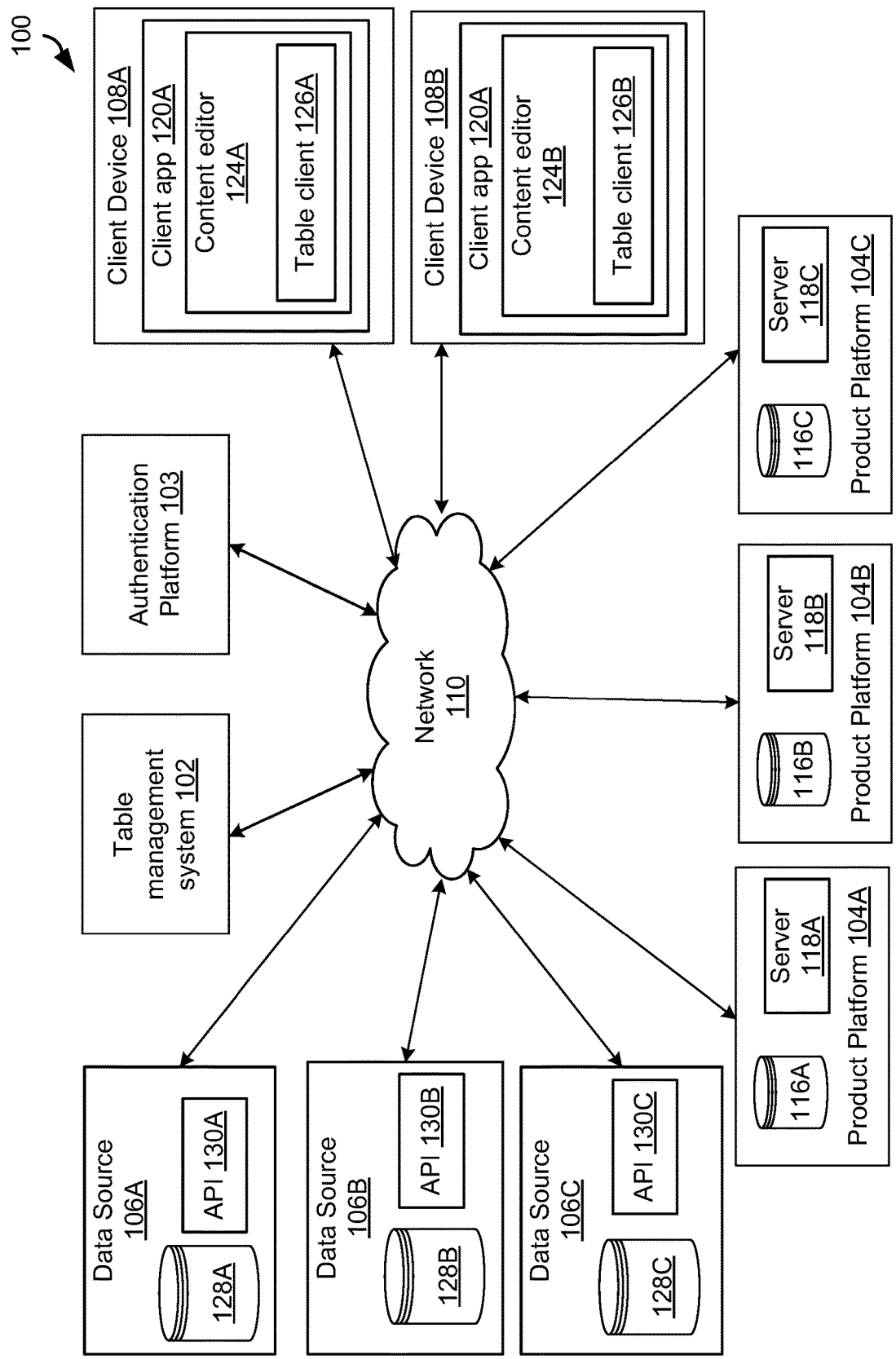
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described previously, document creation and/or management applications may allow users to create and manage tables. Broadly speaking, a table is a data structure that organizes information in rows and columns. A column can specify a particular type of data and a table typically has multiple such columns. Each rows can specify a particular record. The intersection of a row and a column is commonly called a cell. And each cell in a row can include data corresponding to the particular field types indicated by the column the cell belongs to. In this manner data corresponding to multiple records can be stored and displayed in a concise manner.

However, tables provided by most document creation and/or management applications have potential issues. In particular, most document creation and/or management applications provide little to no intelligence in their tables. For example, although Microsoft Word® allows users to create tables having any number of columns and rows, it does not provide any intelligent customization based on the type of data for which the table is created.

Further, although users can define column headings for a given table, the document creation and/or management application does not perform any checks to determine if the content entered by the user in any particular cell corresponds to the heading associated with the column in which the cell is located. Therefore, users can make errors when adding data to the table. This might not be too difficult to rectify once the user has identified the error in small tables, but can be increasingly difficult when larger tables are used having tens of columns and hundreds if not thousands of rows.

In addition, traditional tables can be used to input text or numerical data, but are often not suitably programmed or configured to allow other type of data (e.g., checkboxes, charts, graphs, graphical representations) to be added to the table.

Further still, traditional document creation and/or management applications provide very little if any in-built capability of summarizing the data presented in the table. Microsoft Excel for example, can provide a sum of the number of items in a column or a sum of the values in a given column, but does not intelligently understand the type of data input in a column and then offer a summarization of the data based on the type of data.

Finally, it is often difficult to automatically retrieve data from external sources to add into a table. Most document creation systems do not offer this functionality and the ones that do require the user to create complex macros in order to be able to extract data from external sources. These issues make traditional tables difficult and cumbersome to use.

To address one or more of these issues, embodiments of the present disclosure introduce an intelligent table application that allows users to directly create tables in their content using data from external sources. Further, based on the type of data to be added in a table, the presently disclosed table application can determine suitable field types that can be selected for the table and can extract records corresponding to the selected field types automatically and without further user intervention once the field types are selected. In this manner, field types can be customized based on the source of external data. For example, if the external source is an issue management system project (available via an issue management application), the table application can identify suitable field types as issue identifier, issue status, issue assignee, number of days issue in current status, etc. and present these to a user once the user has selected the external data source.

As the data is directly retrieved from external sources, the presently disclosed table application can display the current values of the data available at the external source whenever the table is rendered. For example, continuing from the previous example, if the external source is an issue management system project and the table includes issue identifiers and the corresponding status of the issues, if the issue status changes in the project, these changes are reflected in the table whenever the table is rendered.

In certain embodiments, if a user amends the data entries in the table, these changes can be pushed to the external source such that the corresponding data can be automatically amended in the external source as well. Alternatively, if a user wishes to amend data entries in the table, the user may be allowed to disconnect the table from the external source. In this case, the data entries in the table would no longer be updated when the underlying data in the external data source changes and any changes made by the user to the data entries within the table are not pushed to the external data source either.

In some embodiments, the table application provides a multitude of representation types to represent data in a column. In this disclosure, this is generally referred to as column type. If data is extracted from an external data source and column fields are selected based on the extracted data, the presently disclosed table application can determine one or more suitable representation types to represent the selected data. For example, if a particular column for a issue management system table is meant to display issue creation date, the table application can determine that the column is meant to include dates and can determine a suitable manner for displaying dates (e.g., in DD/MM/YYYY format or on a timeline).

Alternatively, the table application may allow a user to manually select a representation type for a particular column (e.g., if the user wishes to create a local table or has not yet retrieved data for the table from an external data source). Once a representation type is selected, the table application applies it to all the cells in the columns—i.e., pre-existing cells and any new cells created subsequently. For example, if a user selects a checkbox column type, each cell in the column can automatically be updated to include a checkbox. Similarly, if a date column type having the DD/MM/YYYY format is selected, each cell in the column can automatically be updated to include a date picker control.

In addition, the presently disclosed table application can determine if a user has erroneously added an incorrect entry in a particular cell and alert the user to this error as soon as the error is made. For example, if a user has selected a particular column type to be a date column and the user enters textual data in the cell, the user is immediately notified of the error and in some cases the table can be configured to reject data entry that does not match the selected column type. Also, if the column type of a particular column is amended after data is entered for that column, the table application disclosed herein can determine whether the cell entries in that column can be represented using the amended column type and change the representation type of the data if it can be represented using the amended column type or remove the data entry if the data entry cannot be represented using the amended column type.

Further still, depending on the type of data selected for a table, the presently disclosed table application can intelligently summarize data entered in a table. For instance, the system can determine the field type of a column and summarize the date entries in that column based on the determined field type. For example if an "issue creation date" field is used for a column, the disclosed table application can summarize the issue creation dates in the column as a range from the oldest to the newest date. Similarly, if a column includes a slider and data entries in the column indicate a score from 1-10 on a slider, the table application can summarize the column entries and render a slider control showing as an average of the individual slider ratings.

In some embodiments, a table that is created in content once can be copied and pasted elsewhere in the same content or in some other content and either maintain connection to the underlying data source (if the original table is connected to the external data source) or remain disconnected from the underlying data source (if the original table is disconnected from the external data source).

These and other aspects of the present disclosure will be described in detail with reference to FIGS. 1-7 below.

Environment Overview

FIG. 1 illustrates an environment 100 in which one or more aspects of the present disclosure are implemented. Specifically, FIG. 1 illustrates the systems involved in creating, and managing intelligent tables. The systems include a table system (comprising server-side components referred to as a table management server (TMS) 102 and an authentication platform 103 and client-side components referred to as table clients 126A and 126B), product platforms (e.g., product platforms 104A, 104B and 104C, collectively referred to as product platforms 104), data sources (e.g., data sources 106A, 106B, and 106C, collectively referred to as data sources 106), and client devices (e.g., client devices 108A and 108B, collectively referred to as client devices 108). The TMS 102, product platforms 104, data sources 106, and client devices 108 communicate with each other over one or more communication networks 110.

The TMS 102 is the server-side component of the table system and is configured to receive and service requests for retrieving and managing table data from external sources. In particular, it is configured to communicate with the product platforms 104 to service requests for retrieving table data from external data sources and with the data sources 106 to retrieve data for the tables.

In case the table data is to be retrieved from restricted content, the TMS 102 interacts with the authentication platform 103 to enable authorization of the user and retrieve permission to access the restricted content hosted on the data sources 106. In order to perform these functions, the TMS 102 and the authentication platform 103 include a number of subsystems and modules, which will be described in detail with respect to FIG. 2.

In general, each product platform 104 is a system entity that hosts one or more software applications and/or content. Each platform 104 may include one or more servers (e.g., 118A, 118B and 118C, collectively referred to as servers 118) for hosting corresponding software application(s) and one or more storage devices (e.g., storage devices 116A, 116B and 116C, collectively referred to as storage devices 116) for storing application specific data. Examples of software applications hosted by product platforms 104 may include interactive chat applications, collaborative applications, software code management system, and issue tracking applications. It will be appreciated that the software applications need not be offered by the same organization and that the presently disclosed invention can be used with any product platform such as Google Docs, Apache OpenOffice, configured to interact with the TMS 102.

In order to run a particular application, each server 118A, 118B, 118C may include one or more application programs, libraries, APIs or other software elements that implement the features and functions of the application. In one example the product servers 118A-C may include a content rendering module (not shown) which provides content rendering functionality as described in detail below.

The product platforms 104 also store product data. Product data generally includes: data defining the operation of the hosted application (for example, user accounts, user permissions, and the like); and application data (i.e., the content hosted/maintained by the application, which can be, for example, issue data, page/document data, conversation and chatroom history, etc.). The data is stored on and managed by databases 116A-C. Databases 116A-C may be provided by database servers which may be hosted by servers 118A-C respectively, but are more typically hosted on separate physical computers in communication (directly or indirectly via one or more networks) with the servers 118A-C.

While single server architecture has been described herein, it will be appreciated that one or more of the product platforms 104 can be implemented using alternative architectures. For example, in certain cases a clustered architecture may be used where multiple server computing instances (or nodes) are instantiated to meet system demand Conversely, in the case of small enterprises with relatively simple requirements a product platform 104 may be a stand-alone implementation (i.e. a single computer directly accessed/used by the end user).

The data sources 106A-C host content and make this content available to one or more users on client devices 108. In the present disclosure, the TMS 102 is configured to retrieve content for tables from the data sources 106A-C. The data sources 106A-C may be external data sources (i.e., hosted by third parties) or internal sources (i.e., hosted by organizations that provide the product platforms, or organizations that use the product platforms). Examples of external data sources may include cloud content management systems, web-based list making applications, etc. Examples of internal data sources may include employee databases, finance spreadsheets, team structure databases, etc.

The data sources 106A-C include API modules 130A-C via which the TMS 102 can communicate with the data sources and in particular make requests for content and/or provide instructions to perform actions on the content. Some data sources 106 may be publicly accessible—i.e., the information available at the data sources 106 may be available for anybody to view. Alternatively, some data sources 106 may store at least some private/sensitive information that is restricted to certain individuals/teams, etc. In case the data sources host private/sensitive information, the data sources may also include an authorization service (not shown) that may be utilized to grant permission to the TMS to perform actions and retrieve content on behalf of users. This authorization service may communicate with the authentication platform 103 to grant permissions when the TMS polls the data source 106 to retrieve data for a particular dynamic element. In addition to the authorization service, the data source(s) may also include permissions databases 128A-C, which stores information about the permissions granted by the data source to one or more entities (including the dynamic element management system) to view and retrieve data on behalf of data source users.

Client devices 108A-B may be any device suitable for performing client-side operations described herein, for example a mobile device (e.g. a tablet or mobile phone), a portable device (such as laptop computer), or any other computing device (e.g. a desktop computer).

Generally speaking, users of client devices 108A-B are associated with one or more user accounts and generate and/or view electronic content on one or more product platforms 104A-C. This activity includes any type of user account interaction with the product platforms 104, including interaction with content and/or software applications hosted by the product platforms 104. Example interactions include accessing/viewing and/or contributing to one or more documents hosted by the product platforms, writing posts, commenting on content, visiting web pages, sharing, liking, or viewing content, communicating with user accounts in real-time chat interfaces, etc.

In order to allow users to perform these functions, as illustrated in FIG. 1, each client device 108 includes one or more client (software) applications (e.g., client applications 120A and 120B) that are configured to access software applications made available by product platforms 104. In some cases, the client devices 108 may include a client application corresponding to each product platform 104 the client device 108 has access to. In other cases, a single client application (e.g., a web browser) may be utilized to communicate with multiple product platforms.

The client applications 120 include instructions and data stored in the memory (e.g. non-transitory computer readable media) of the client devices 108 on which the applications are installed/run. These instructions are executed by a processor of the client device 108 to perform various functions as described herein. By way of example, some functions performed by the client applications 120 include communicating with applications hosted by the product platforms 104, rendering user interfaces based on instructions received from those applications, receiving inputs from user to interact with content hosted by product platforms 104.

The client application 120 may be implemented in various ways. For example, the client applications may be web browser applications (such as, for example, Chrome, Safari, Internet Explorer, Opera) which access the applications hosted by the product platforms 104 and/or TMS 102 via appropriate uniform resource locators (URL) and communicate with these systems via general world-wide-web protocols (e.g. HTTP, HTTPS, FTP). In this case the web browser application is configured to request, render and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platforms 104 and/or TMS 102 using defined application programming interface (API) calls.

The client applications 120 include content editors 124, i.e., interfaces for allowing users to create content, such as webpages, issues, conversations, posts, comments, etc. In some cases, content editors 124 may use an iframe element for the content creation area. When a user clicks in the iframe, they can enter text, images or any other content in the iframe and once the user is done, they can submit the text so that the particular user interface currently displayed can be updated with the content submitted by the user. When the product platforms offers word processing or spreadsheet functionality, the content editors 124 may utilize the entire displayed user interface to receive user inputs.

According to the present disclosure, the content editor 124 includes a table client 126, which is configured to detect when a user wished to create a table in the content editor 124, generate and render a table, communicate a request for data for the table to the TMS 102, retrieve data for the table from the TMS 102, and populate the table with the retrieved data. In case multiple data fields are received from the TMS 102, the table client 126 may also be configured to allow the user to select one or more data fields the user wishes to insert in the table. In addition, the table client 126 may be configured to provide options to disconnect the table from external data sources, format the table, summarize the table, add/delete columns or rows, determine whether data entered in a cell matches the column type selected for the corresponding column, and/or aid in authentication of a user if the table includes restricted content.

As illustrated in FIG. 1, communications between the TMS 102, authentication platform 103, client devices 108, product platforms 104, and data sources 106 are via the communications network 110. The communication network 110 is depicted as a single network in FIG. 1 for ease of depiction. However, in actual implementation, the various systems illustrated in FIG. 1 may communicate with each other over different communication networks. For example, the TMS 102 may communicate with the authentication platform 103, product platforms 104 and internal data sources through a local area network (LAN), whereas it may communicate with the client devices 108 and external data sources via a public network (e.g., the Internet). Similarly, the product platforms 104 may communication with one or more client devices 108 via a LAN and with other client devices 108 via a public network without departing from the scope of the present disclosure. Furthermore, the TMS 102, authentication platform 103, product platforms 104 and data sources 106 may communicate with each other over open web protocols such as (HTTPS, REST, and JWT).

It will be appreciated that although only two client devices (108A and 108B), three product platforms (104A, 104B and 104C) and three data sources (106A, 106B, and 106C) have been depicted, in normal operation, many more client devices 108, data sources 106 and product platforms 104 may be connected to the identity platform through the network 110. Furthermore, it will be appreciated that in some cases users may wish to insert data items in a table from content hosted on one or more product platforms 104 and in such cases the product platforms 104 are also the data sources 106 for the data items.

Further, although table client 126 is depicted in FIG. 1 as being installed on or executing on product clients 120, this is not necessary. In certain embodiments, the table client may be a standalone client-side table application that is installed on and executing on the client device independent of other product applications.

System Architecture

Figure 2:
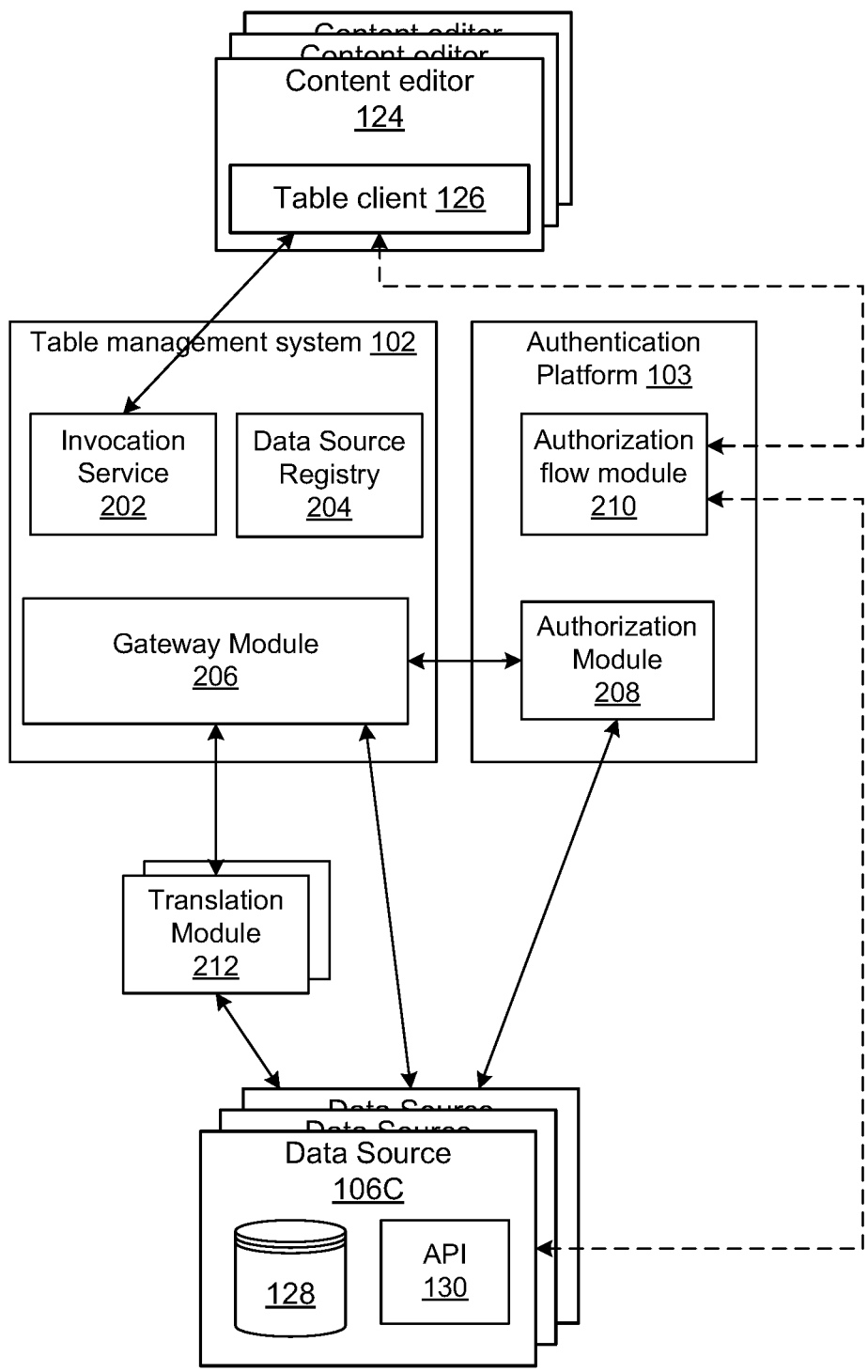
FIG. 2 is a block diagram of a table management system according to various embodiments of the present disclosure.

FIG. 2 illustrates the subsystems and modules of the TMS 102 and the authentication platform 103. In general, the TMS 102 includes an invocation service 202, a data source registry 204, and a gateway module 206. The authentication platform 103 includes an authorization module 208 and an authorization flow module 210. In addition, FIG. 2 illustrates that the content editors 124 and the table client 126 communicate with the TMS 102 via the invocation service 202 and with the authentication platform 103 via the authorization flow module 210. Similarly, the data sources 106 are in communication with the gateway module 206 of the TMS 102 and with the authorization module 208 of the authentication platform 103.

Generally speaking, data sources 106 maintain their content in many different ways. For example, some data sources may store content in a fragmented manner; other data sources may store their data in an unstructured format; whereas still other data sources may store their data in a structured format. Even within these different methodologies, the data sources 106 may utilize different standards, languages, or schemas for storing their content. The TMS 102 however is configured to consume data in a particular format. To account for this, one or more data sources 106 (e.g., the data sources that do not store their data in the same format as that used by the TMS 102) may further be associated with their respective translation modules 212. A translation module 212 is a stateless service that communicates with the TMS 102 and its respective data source 106 and translates the communications between these entities into languages/formats that are understandable to the respective entities. For example, the translation module 212 associated with a particular data source 106 may be configured to receive content requests from the TMS 102 and forward these requests to the data source 106 (e.g., in a language understood by the data source). It may also be configured to receive responses (including content and error messages) from the data source 106 and forward these to the TMS 102 (e.g., in a language understood by the TMS 102).

In certain embodiments, the TMS 102 is configured to receive content from the data sources in a structured format and preferably using the JavaScript Object Notation for Linked Data (JSON-LD) schema. In these embodiments, the translation module 212 is configured to retrieve content from its respective data source and convert this into a JSON-LD file and forward it to the TMS 102.

The invocation service 202 is configured to communicate with the table clients 126 to receive table data requests and service these requests. The data source registry 204 maintains a list of data sources 106 that are supported by the TMS 102. In certain embodiments, the registry 204 maintains descriptors of third party data sources 106 that have agreed to service table data requests.

In certain embodiments, the data sources 106 can communicate with the TMS 102 to register their platforms. In this case, the TMS 102 may provide an interface to the data source 106 to provide information for storing in the data source registry 204. The TMS 102 records the information in the form of a data source descriptor in one or more data structures. Each descriptor may store relevant information for retrieving content from the data source 106.

For example, for a unique data source descriptor, the TMS 102 may store the following information:

Identifier (ID): that uniquely identifies the data source.
Data source name: the name of the application or service—e.g., Google Spreadsheets, Asana, Trello dashboards, Jira Service Desk, etc.
Domain name(s): one or more domain names associated with the data source.
Restricted flag: a flag that indicates whether the data source is a restricted data source or not. As referred to herein, a restricted data source is a data source that includes content that is restricted to one or more users and not available publicly. Examples of restricted data sources include web or cloud collaborative document management systems, and collaborative management systems. It will be appreciated that not all content available on a restricted data source is restricted. In fact, restricted data sources may also host content that is available publically. Public data sources on the other hand store only publicly available content. Examples of public data sources include Wikipedia, Webster dictionary, etc. Even if a data source may offer some publicly available content, if restricted content is also hosted on the data source, this flag is selected.
A resolve API: this is the location that can be addressed by the TMS 102 to submit table data requests. In case the data source is associated with a translation module 212, this API points to the translation module 212.
A container ID: This is a unique identifier for a container assigned to the data source by the authentication platform 103 in which configuration information for authenticating users may be stored. It will be appreciated that this field is used for restricted data sources and may not be used for public data source. In certain implementations, the container ID is assigned by the authentication platform 103 or the TMS 103 when the data source descriptor is created.

The data structures and fields described are provided by way of example. Depending on the implementation, additional, fewer, or alternative fields may be used. Further, the fields described in respect of a given data structure may be stored in one or more alternative data structures (e.g. across multiple linked data structures). Further still, although tables are used to illustrate the data structures, the relevant fields/information may be stored in any appropriate format/structure.

The gateway module 206 is typically in communication with subsystems of the TMS (such as the invocation service 202 and the data source registry 204) and with the subsystems of the authentication platform 103. It is also configured to communicate with third party data sources 106. In particular, the communications between the gateway module 206 and the invocation service 202 include receiving and servicing content requests. The gateway module 206 communicates with the data source registry 204 and the authentication platform 103 to retrieve access keys for requesting restricted content from data sources 106. Finally, it communicates with the data sources 106 to retrieve content.

The authorization module 208 is configured to communicate with the data sources 106 to receive permission for accessing user content from the data sources on behalf of the users. It is also configured to store the permissions granted to the TMS 102 to retrieve restricted content from the data sources 106 on behalf of users. In particular, it stores access keys (e.g., tokens or passwords) that may be used to retrieve content from the data sources. Typically, an access key uniquely identifies a particular user, a particular party requesting access on behalf of the user (TMS 102 in this case), and/or what permissions the user has agreed to give to the requesting party. When a user first requests a table data to be added or requests to view a table that includes data associated with restricted content, the user is requested to log-in to their account maintained by the data source 106 and consent to the TMS 102 contacting the third party data source on their behalf to retrieve restricted content from the data source 106 that the user has access to. When the user does this, an authorization server (not shown) associated with the data source 106 generates an access key that indicates that the TMS 102 is authorized to retrieve content from the data source 106 (that the user has access to) on behalf of the user. This access key is stored by the authorization module 208 against the user ID.

In certain embodiments, the authorization module 208 maintains containers for each data source 106 it supports—each container uniquely identified by a container ID. Further, each container includes authentication information pertaining to the particular data source it is associated with.

For example, in a unique data source container, the authorization module 208 may store the following information:

A client ID: that uniquely identifies the entity requesting authorization on behalf of the user. In this case, the client ID is the ID of the TMS 102.
A secret: is a passphrase or a secret known only to the entity requesting authorization on behalf of a user and the authorization server of the data source. This is typically stored in an encrypted or hash form.
User IDs: this is a list of user ID of users of the TMS 102 or the product platforms 104 that have authorized the TMS 102 to retrieve content from the data source on their behalf. Authorization endpoint: this is the API endpoint of the data source's authorization server to which the client device 108 has to be redirected so that the user can be authenticated and can consent to authorizing the TMS 102 to retrieve content on its behalf.

Exchange endpoint: Once the user provides consent, the authorization server of the data source generates a one-time token/code. The authorization module 208 has to then exchange this one-time token/code for an access key. The exchange endpoint is the API endpoint of the data source's authorization server which the authorization module has to contact to retrieve the access key.

Profile endpoint: this endpoint points to the location in the data source server where the user's profile information can be retrieved. This is useful in case a user maintains multiple accounts with the data source and wishes to authorize the TMS 102 to retrieve content from the data source associated with multiple accounts maintained by the user with the data source.

The permissions database 128 of the data source 106 also stores a copy of the access keys it has generated and assigned to different entity and user account pairs.

A user may modify/cancel these permissions at any time. If this happens, the corresponding data source 106 and the authorization module 208 are configured to delete the access keys. Further, the access keys may expire after a given time. In this case, the authorization module 208 may request the data source to reissue a new access key. In one example, the access keys may be generated and handled according to an authorization protocol such as the OAuth 2.0 protocol.

The authorization flow module 210 allows a user to authorize TMS 102 to retrieve content from data sources on behalf of the user. When authorization is required (e.g., because TMS 102 does not have permission to retrieve content on behalf of the user), the table client 126 communicates with the authorization flow module 210, which in turn redirects the user to the data source's authorization endpoint, where the user can login (if required) and consent to giving TMS 102 the permissions to access content. When the user is authenticated and has consented, the data source generates a one-time code/token, which is forwarded back to the authorization flow module 210. The authorization flow module 210 in turn provides this token to the authorization module 208, which exchanges this token for an access key from the data source 106.

Hardware Overview

The operations/techniques described herein are implemented by one or more special-purpose computing systems or devices. For example, in environment 100: the TMS 102 may be provided by one or more computer systems; the authentication platform 103 may be provided by one or more computer systems; each product platform 104 may be provided by one or more computer systems; each client device 108 is a computer system; and each of the data sources 106 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 3:
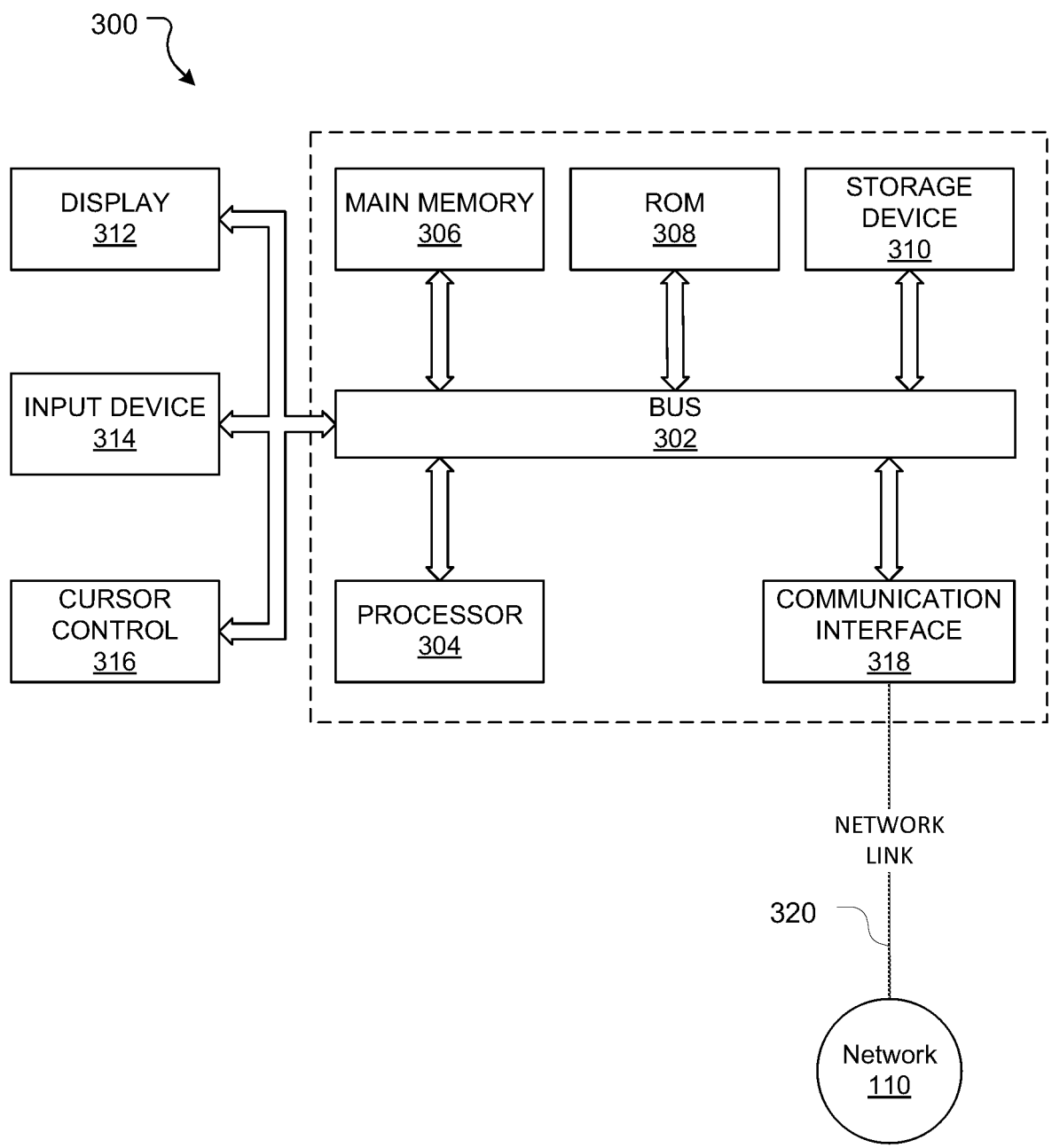
FIG. 3 is a block diagram of a computing system with which various embodiments of the present disclosure may be implemented.

For example, FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Processor 304 may be, for example, a general-purpose microprocessor.

Computer system 300 also includes a main memory 306 (also referred to as non-transitory computer readable media or medium), such as a random-access memory (RAM) or other dynamic storage device, coupled to bus 302 for storing information and instructions to be executed by processor 304. Main memory 306 may also be used for storing temporary variables or other intermediate information during execution of instructions to be executed by processor 304. Such instructions, when stored in non-transitory (computer readable) storage media accessible to processor 304, render computer system 300 into a special-purpose machine that is customized to perform the operations specified in the instructions.

Computer system 300 further includes other types of non-transitory computer readable media including a read only memory (ROM) 308, storage device 310, or other static storage device coupled to bus 302 for storing static information and instructions for processor 304. As shown in FIG. 3, a storage device 310, such as a magnetic disk or optical disk, is provided and coupled to bus 302 for storing information and instructions. If the computer system 300 is part of the TMS 102, the storage device 310 may store the data source registry 204.

In case the computer system 300 is the client device 108, it may be coupled via bus 302 to one more output devices such as a display 312 for displaying information to a computer user. Display 312 may, for example, be a cathode ray tube (CRT), a liquid crystal display (LCD), a light emitting diode (LED display), or a touch screen display. An input device 314, including alphanumeric and other keys, may be coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to network 110. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks 110 to other computing systems. For example, if the computing system 300 is part of the TMS 102, the network link 320 may provide a connection through network 110 to client devices 108, data sources 106 or product platforms 104.

Computer system 300 can send messages and receive data, including program code, through the network(s), network link 320 and communication interface 318. In the TMS example, the invocation service 202 may receive table data requests from the product platform 104A through the network 110 and communication interface 318.

Exemplary Methods

This section describes various methods and processes for creating and viewing tables according to aspects of the present disclosure. Generally speaking, the process for viewing and creating a table based on external data is similar. In one case the content editor 124 detects selection of a table creation command in the content editor 124 whereas in the other case a product platform viewer identifies a table placeholder in the content being viewed. Once a determination is made that a table is to be inserted in the content which is connected to an external data source, the processes for creation and viewing the table are similar and therefore only one process—i.e., a process for inserting a table which includes external data is described here.

As described previously, in some embodiments, data for the entire table can be retrieved from a single data source. In other embodiments, data for one or more columns of the table may be retrieved from one or more data sources 106. For example, data for one column may be retrieved from an issue management system that stores information about issues and projects, whereas data for another column may be retrieved from an identity database that stores information about users of the product platform or employees of an organization.

Figure 4A:
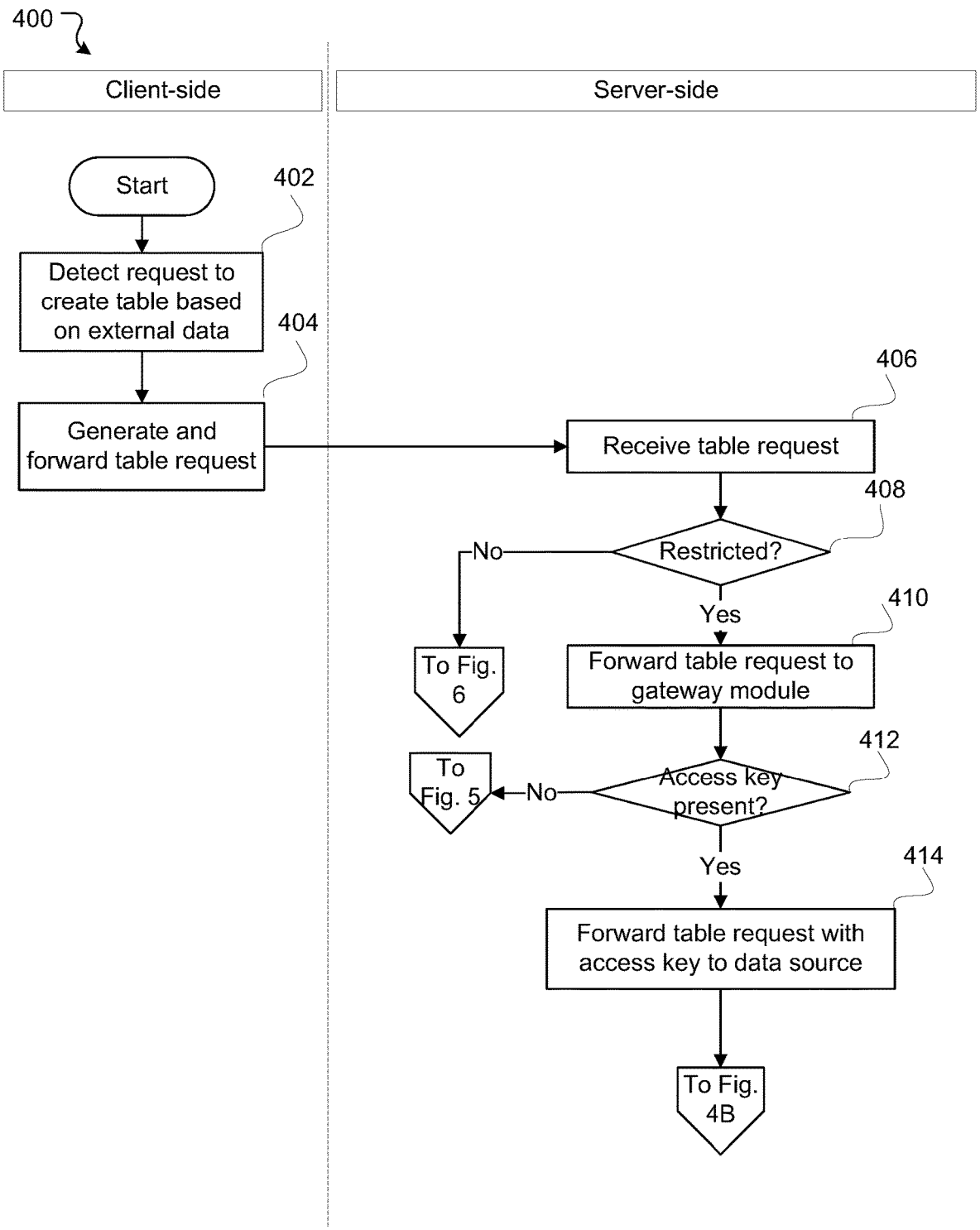
FIGS. 4A-4B depict a flowchart illustrating a method for creating a table according to some embodiments of the present disclosure.
Figure 4B:
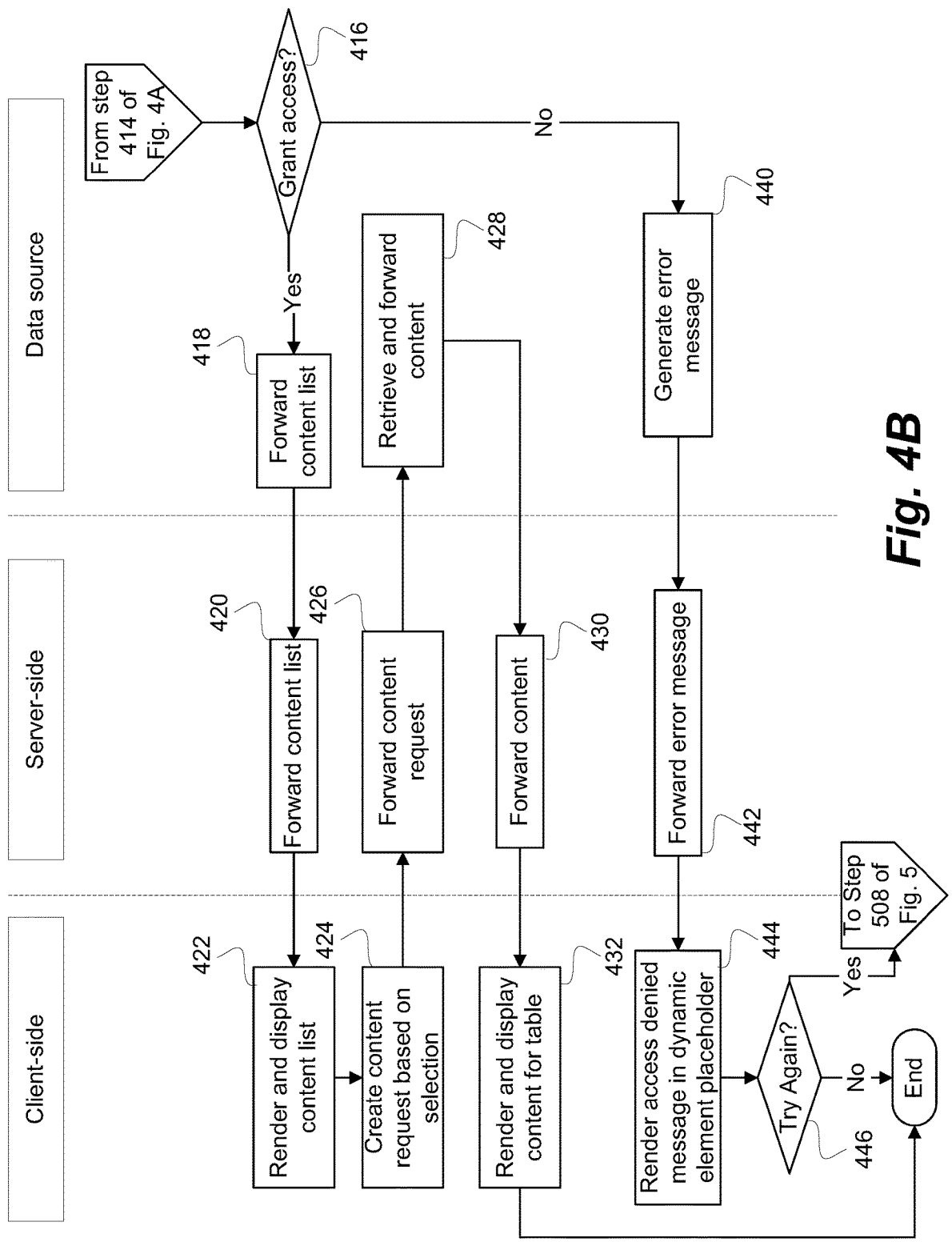

FIGS. 4A-4B depict an exemplary method 400 for creating a table based on external data retrieved from a single data source. However, with slight modifications, method 400 can be performed for retrieving data from two or more data sources as well.

In this example, operations of method 400 that are described as being performed by the client device 108 are performed by the client device 108 under control of the content editor 124 and table client 126. Similarly, operations of method 400 described as being performed by server-side components are performed by the various subsystems and modules of the TMS 102 and the sub-systems of the authentication platform 103, and operations described as being performed by the data source 106 are performed by the API module 130 of the data source 106 and/or the translation module 212 (if present).

The method begins at step 402, where the client device 108 detects a command to create a new table. This detection can occur when a user is creating content (e.g., when the user is using content editor 124) and it can happen in a number of different ways. In one example, a user may be in the middle of creating content via the content editor 124 and may select a graphical interactive element such as a button or icon for creating a table. The table client 126 detects selection of the graphical interactive element, which invokes the table creation process.

In certain embodiments, once the table creation process is commenced, the table client 126 provides an interface to the user to select a data source 106 from which the user wishes to extract data for the table. In one example, a list of data sources 106 that have registered with the TMS 102 may be retrieved from the data source registry 204 and displayed to the user in a pop-up menu, drop down menu, or the like. Alternatively, if a large number of data sources 106 have registered with the TMS 102, the list of external data sources may be provided through a picker control interface.

Once the user selects a particular data source 106 from the displayed options, the table client 126 generates a table request at step 404. This request includes the identifier of the selected data source 106 and some information to help the TMS 102 identify the user that generated the table request. In some cases, this information may be a user ID. In other cases, this information may be a session token (e.g., a cookie) associated with the particular user which can be converted by a proxy service (not shown) located between the client device 108 and the TMS 102 into a user ID of the user associated with the session token. Once generated, the table request is forwarded to the TMS 102.

At the same time, at client device 108, the table client 126 generates a table placeholder and renders it for display on the client device 108 at step 404. This improves user experience as the user understands that the TMS 102 is performing tasks in the background to retrieve data from the selected data source 106 and has not simply crashed/stopped working. In one embodiment, instead of or in addition to displaying the placeholder, the table client application may generate and render an animated graphical control element such as a spinning hour glass, throbber, spinning wheel, etc. indicating that the TMS 102 is attempting to retrieve data from the selected data source 106.

Upon receiving the table request and the user ID (which may be included as part of the table data request or not), the TMS 102 and in particular the invocation server 202 determines whether the data source is a public data source or a restricted data source (at step 408). This determination is made because the processes for retrieving data from a public data source and a restricted data source are different. To retrieve data from a public data source, the TMS 102 does not need to communicate with the authentication platform 103 and/or perform an authentication/authorization check, whereas this is needed in case content is required from a restricted resource.

In one embodiment, the invocation service 202 determines whether the data source is a public data source or a restricted data source by performing a lookup in the descriptor of the data source (e.g., looking up the 'restricted content flag' field in the data source descriptor). If the restricted content flag is not activated, the invocation service 202 determines that the data source is a public data source. Conversely, if the restricted content flag is activated in the descriptor, the invocation service 202 determines that the data source is a restricted data source.

If, at step 408, a determination is made that the data source is public, method 400 ends. Alternatively, if a determination is made that the data source is restricted, the invocation service 202, requests the gateway module 206 to retrieve data from the associated data source at step 410. This request may include the user identifier and the data source identifier of the corresponding data source (retrieved from the data source registry 204).

At step 412, the gateway module 206 determines if any access keys are available for the particular pair of user identifier and data source identifier received from the invocation service 202. In certain embodiments, to do this, the gateway module 206 provides the user identifier and data source identifier to the authorization module 208, which checks if any access keys are available for this pair of identifiers.

In other embodiments, the authorization module 208 may not be aware of data source identifiers, but instead may store access keys against container IDs for data sources. In such cases, instead of providing the data source ID to the authorization module 208, the gateway module 206 retrieves a container ID corresponding to the data source ID from the data source registry 204 and forwards this container ID along with the user ID to the authorization module 208, which checks if any access keys are available in the container associated with that container ID for the provided user ID.

If an access key is found, it is returned to the gateway module 206. Otherwise, the authorization module 208 may inform the gateway module 206 that no access keys exist for that pair of user/data source identifiers.

Accordingly, if it is determined at step 412 that access keys are not available, method 500 is activated. Alternatively, if it is determined at step 412 that access keys are available, the method proceeds to step 414 where the gateway module 206 generates and forwards a table request to the data source 106 or the translation module 212. This request includes the available access key. In one example, the gateway module 206 may use an HTML POST message to forward the request to the data source 106.

Typically, a translation module 212 or data source 106 may provide a particular endpoint for servicing data requests from TMS 102. This endpoint, also referred to as a resolve endpoint, is available in the data source's descriptor stored in the data source registry 204. The gateway module 206 retrieves the resolve endpoint from the data source registry 204 and forwards the data request to the resolve endpoint. If the resolve endpoint points to the translation module 212, the translation module 212 forwards the request to the data source at this step.

The data source 106 determines the content for which access should be granted at step 416. In a particular embodiment, the data source 106 checks the access key present in the content request and determines content that can be accessed based on the received access key.

As described previously, the data source 106 maintains a permissions database 128 that includes access keys and corresponding permissions associated with those access keys. Accordingly, at this step, the data source 106 compares the received access key with the access keys stored in its permission database 128 (and their associated permissions) to determine which content the TMS 102 has permission to view/retrieve for the particular user.

The method then proceeds to step 418 where the data source 106 forwards a list of content the user has permission to view to the gateway module 206 which forwards this content list to the invocation service 202, which in turn provides it to the table client 126 (at step 420) to be displayed, e.g., in a dropdown menu or a selector control on the client device 108. The user can then review the list of content items the user has permission to retrieve from the data source 106 and make a selection. If the number of content items hosted by the data source that the user has access to is large, the table client may display a selector control, which is configured to retrieve keywords from the user and forward these to the data source (via the server) such that the data source can filter the content items and provide a short list of content items that match the user keywords.

Returning to FIGS. 4A-4B, once the user makes a selection from the displayed list of content items, this selection is forwarded back to the TMS 102 at step 424, which forwards it to the data source 106 at step 426.

In one embodiment, when the list of content items is forwarded to the client device 108 the list includes the product platform's content item identifiers. When the user selects one or more content items, the identifier associated with the selected content item is forwarded back to the data source.

Next, at step 428, the data source 106 forwards content for the selected content item back to the TMS 102, which forwards it on to the client device 108 at step 430. If the data source 106 stores its data in the format suitable for the TMS 102, the data source 106 may simply create a data file and forward it to the gateway module 206 at this step.

On the other hand, if the data source 106 does not store its data in the format required by the TMS 102, the data source 106 communicates with translation module 212 at this step to forward content data to the TMS 102. In certain embodiments, the translation module 212 may receive an initial set of data from the data source and generate a data file (e.g., a JSON-LD file) from this data. If the initial set of data is not sufficient to create the data file (e.g., because information pertaining to certain fields is not provided in the initial set of data), the translation module 212 may query the data source one or more times to retrieve further data to prepare the data file. Once the translation module 212 has received sufficient information about the selected content item from the data source 106, the translation module 212 may package the data, e.g., in the JSON-LD file, and forward the data file to the gateway module 206.

Table B illustrates an example of a JSON-LD formatted structured response for a particular content management system page.

TABLE B example JSON-LD metadata

```
{
  "meta": {
    "visibility": "restricted"
    "access": "granted"
  },
  "data": {
    "@context": "https://www.w3.org/ns/activitystreams",
    "@type": "Document",
    "name": "[name of the document]",
    "context": {
      "type": "Application",
      "name": "content management system"
    },
    "attributedTo": {
      "type": "Person",
      "name": "[Person name]"
    },
    "image": {
      "type": "Image",
      "url": "[URL for the image]"
    },
    "summary":
      "A proposed approach for representing objects that get rendered into dynamic elements",
    "published": "2017-03-05T12:12:12Z",
    "updated": "2017-03-05T12:12:12Z",
    "url": "[URL for the webpage]"
  }
}
```

In this example, the data includes:

Meta.Visibility: this field indicates the visibility status of the resource. Options include public (i.e. visible to user, no authorization required), restricted (authorization is required), not found (i.e., the object does not exist), or forbidden (i.e., the user does not have permissions to see the resource).

Meta.access: this field indicates the current access level to a restricted resource. Options include: unauthorized (i.e., not accessible without authentication), forbidden (not accessible to the user even after authentication), or granted (i.e., access granted)

@Context: this field provides context for the information provided in the "data" section. For example, it may point to a webpage which provides definitions for the fields used in the "data" section.

@Type: this field indicates the type of content in the content item. In this example, the content management system page is classified as a 'document'. In other cases, e.g., if the content item is an image video, the type can be 'image' and if the content item is source code, the type can be 'source code' and so on.

Name: this field indicates what the content item is—i.e., its name or title.

Context: this field indicates the data source associated with the content and can further include the field 'type' which indicates what the data source is and 'name' which indicates the name of the data source. In this example, the type is an application and the name of the data source is content management system.

Attributed to: this includes details about the author of the content item, including the type of the author (e.g., whether it is a person, a team, an organization) and a name of the author (e.g., name of the person, the team or the organization).

Summary: this field includes a short blurb about the content.

Published: indicates when the content was first published.

Updated: indicates when the content was last updated.

Content: which includes the actual content in the content item along with the type of content. For example, if the content is an issue management project that includes multiple data items—such as active tickets, assignees of active tickets, etc., this field includes the content along with the content type, such as name, number, date, etc., for each data item.

It will be appreciated that these fields are merely exemplary and depending on the type of data hosted on a data source, the fields may vary slightly or drastically from the fields illustrated in the example above. For example, in case the content item is a source code repository, the data file may include information such as last pull request, last commit, person who made the last commit, last updated, number of active pull requests, etc. Similarly, in case the content item is a project on an issue tracking system, the data file may include information such as number of active tickets, number of tickets completed, percentage completed, status, last updated, number of comments, creation date, assignees of tickets, etc.

Returning to FIGS. 4A-4B, once the client device 108 receives content from the TMS 102, the table client 126 renders content for the table placeholder and displays the content in the table placeholder (at step 438).

The content displayed in the table and the particular way in which the content is displayed may vary depending on the types of content being displayed, the data source, and/or the operating system of the device on which the client application is operating. For example, if multiple data fields and corresponding values are retrieved from the data source, the first row of each column of the table may be replaced by a graphical control element such as a drop-down list or a list box that allows a user to select a data field from the retrieved content for that particular column. For instance, in the issue tracking system project example, the drop-down list or list box for each column can include the following data fields: active issues, completed issues, assignee, date created, date completed, number of days issue active, etc.

In some embodiments, the table client 126 may also allow a user to select a column type for the selected data field. For example, if the user selects a data field that has a "number" type, the table client 126 may provide a number of different column types for representing the number values in the given column—including e.g., as text, as a number, or as a graphical slider. Similarly, if the user selects a name database as a data source and selects a username data field for a column that has a "name" type, the table client 126 may provide two column types for displaying the username values in the column—e.g. as text or as profile images associated with the name. In certain embodiments, the profile image may be forwarded to the table client 126 as part of the data file from the external data source. In other embodiments, where the profile image is not provided as part of the data file and the user selects the profile image column type, the table client 126 retrieves this from another data source such as an identity platform by providing the name to the identity platform. In this manner, the table client 126 can retrieve data for a particular table from more than one data source as well.

Alternatively, the table client 126 may automatically select a column type. For example, once a data field is selected, the table client determines the 'type' of the data field (e.g., from the '@Type' field in the retrieved JSON LD file). It may then determine the most suitable manner to display/render that type of metadata field value. For example, if the selected item is an image, the table client 126 may render the image in a cell. In another example, if the selected data field includes multiple number values for a single record, the table client 126 may display the numbers as plain text or as a graph. It will be appreciated that other column types may be contemplated including, e.g., a chart, an emoji, etc., without departing from the scope of the present disclosure. For example, if the selected data field is a satisfaction rating field, the table client 126 may be configured to utilize an emoji column type such that the satisfaction rating for individual records in the column are displayed using emojis ranging from a frowning face to a smiling face.

Once a user selects a data field (and in some examples a column type for the data field) the table client 126 can automatically identify the data items corresponding to that data field and can automatically populate the table—e.g., by adding rows and populating the rows with the identified data items in the particular selected column types for the table.

Further, the selection of a particular data field for each table column may be saved e.g., by the product platform 104 on which the table is being created when the table is first created. Thereafter, whenever the table is accessed, no data field choice may be provided to the user, instead, the real time values corresponding to the selected data fields are directly displayed in the table.

If a user wishes to alter/edit the table once it is created, e.g., to change, remove, or add new columns, an edit control element may be selected. In some embodiments, the table client 126 determines whether the user has permission to edit the table (e.g., based on user permissions for the content in which the table is displayed) and if it is determined that the user has permission to edit the table, providing the column field selection controls to add/change/delete one or more columns in the table. It will be appreciated that in this manner, a user is allowed to change the data fields displayed in the table. If the user also wishes to change the value of one or more cells, the table client 126 may display a warning message to the user indicating that the values are dynamic real-time values retrieved from data source 106 and if the user wishes to amend the value of one or more cells, the table will be disconnected from the data source 106. If the user wishes to proceed, the table client 126 may be configured to disconnect the table from the data sources from which the values were retrieved. In this case, the table values are locally stored at the product platform 104 and the table client does not communicate with the data sources 106 anymore to retrieve/update table cells. In some examples, it may be possible to reconnect the table to the data source(s) 106. However, in this case, the cell values will be automatically updated based on the corresponding values of the data in the data source(s) when the table is rendered.

Returning to step 416, if the permission corresponding to the received access key is not sufficient to grant access to content (e.g., because the user does not have permission to access any content from the data source), the data source 106 determines that access should not be granted at step 416 and the method proceeds to step 440 where the data source 106 generates and forwards a message to the gateway module 206 informing the gateway module 206 that the user does not have access to any content on the selected data source 106. This message is routed back via the invocation service 202 to the client device 108 at step 442. Upon receiving the message (at step 444), the table client 126 generates an error message in the table placeholder informing the user that there is no content on the selected data source that the user has access to. In certain embodiments, the error message may notify the user that the user's current account is not authorized to access content and the user can try to connect via a different user account.

If the user decides to try a different account, the user selects this option from the error message at step 446 and the method proceeds to step 508 of method 500 (which will be described later on).

In case the user does not wish to access the data source with another user account (at step 446) or if that option is not provided, the user may manually create the table, select another data source from which to retrieve data, and/or delete the table.

The process so far describes the situation where the TMS 102 has permission to retrieve restricted content on behalf of a user. However, as described previously, in some cases, the TMS 102 may not have the required permissions. In this case, the TMS 102 is configured to initiate and guide the user through an authorization and authentication process to obtain an access key.

Figure 5:
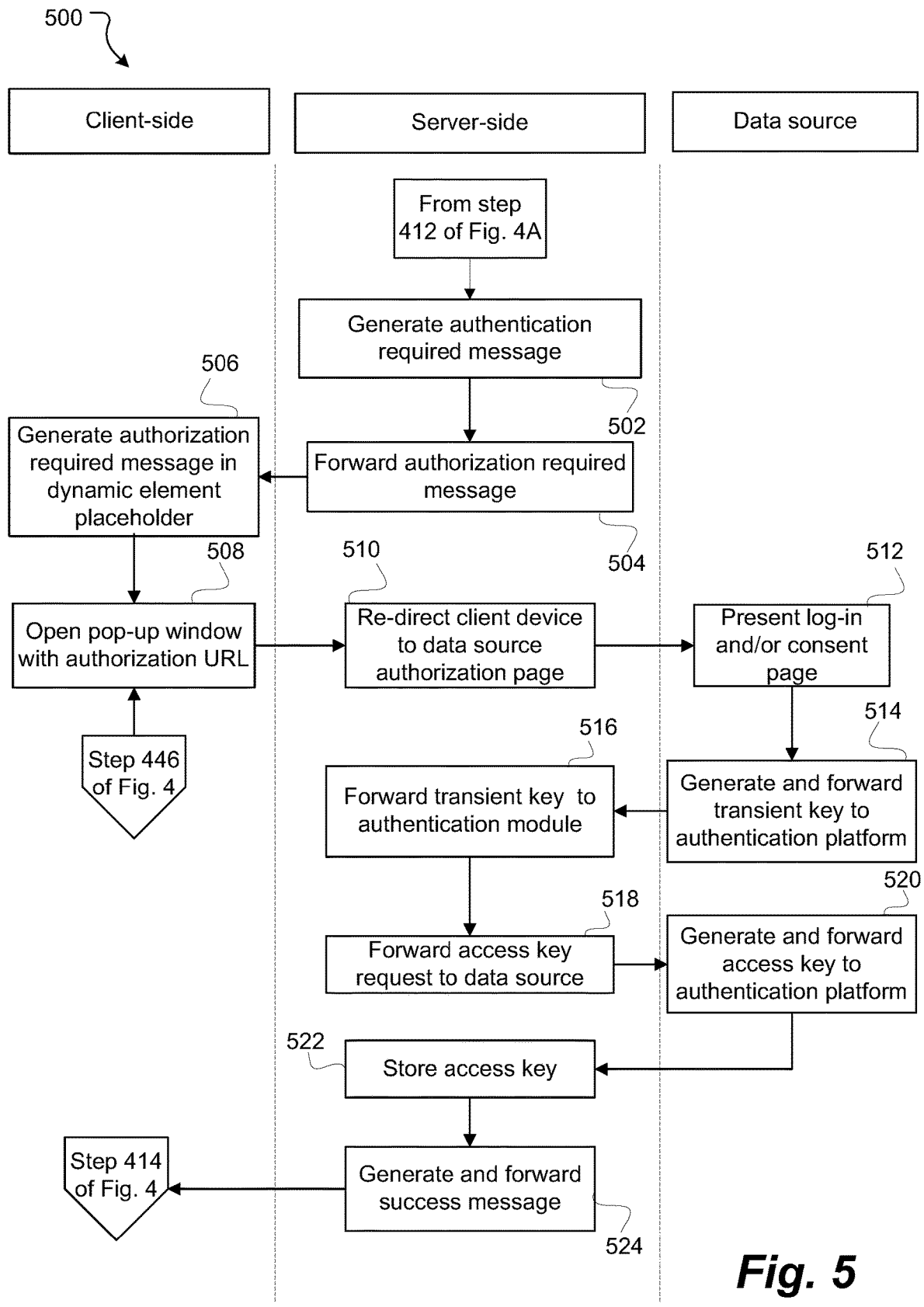
FIG. 5 is a flowchart illustrating a method for creating a table when authorization is required according to some embodiments of the present disclosure.

This process is described with reference to FIG. 5. In particular, the process depicted in FIG. 5 illustrates the process performed after step 412 of method 400, when the gateway module 206 cannot find any access keys associated with the user and data source pair.

The method begins at step 502, where the gateway module 206 generates and forwards a message to the invocation service 202 that indicates that authorization is required to access content from the data source 106. This message is then forwarded by the invocation service 202 to the client device 108 at step 504. Next (at step 506), the table client 126 updates the table placeholder to inform the user that the user has to authorize TMS 102 to retrieve content from the selected external data source on behalf of the user.

If the user decides to proceed (i.e., connect with the data source 106), the table client 126 and the authorization flow module 210 may commence an authorization process. In certain embodiments, this authorization process is based on the OAuth 2.0 standard.

Accordingly, at step 508, when the table client 126 detects that the user has selected the interactive graphical element to connect with the data source 106, the table client 126 opens a pop-up window (at step 508). The opening of the pop-up window starts the authorization flow module 210 of the TMS 102, which initiates the authorization process with the data source 106. In particular, at step 510, the authorization flow module 210 redirects the client device 108 to the data source's user login and/or authorization service.

In order to redirect the client device 108 to the data source's authorization service, the authorization flow module 210 needs to know at least the authorization endpoint (i.e., the address of the data source's authorization service) and the client ID of the TMS 102. This information is stored in the authorization module 208. Accordingly, at this step, the authorization flow module 210 requests the authorization module 208 to send it the authorization endpoint and the client ID of the TMS 102 for that particular data source 106.

The authorization module 208 retrieves this information from the container associated with that particular data source and forwards the information to the authorization flow module 210. Once the authorization flow module 210 has this information it provides the client ID to the data source's authorization service and redirects the client device 108 to an authorization page hosted by the authorization server (at the location pointed by the authorization endpoint).

If the user is not already logged in, the user may enter their log-in details (to log into the data source 106) via the authorization page at step 512. Once the user is logged in or if the user is already logged in, the authorization web page directs the user to a consent page where the user is advised that the TMS 102 would like to access the user's data source account to view and retrieve content from the data source that the user has access to. The user may then accept or decline to provide consent.

If the user is logged in and provides their consent (at step 512), the authorization service of the data source 106 generates and forwards a transient key (e.g., one time password/code/token valid for a predetermined time period) to the authorization flow module 210 at step 514 and redirects the client device back to the authorization flow module 210. The authorization flow module 210 in turn forwards this transient key to the authorization module 208 at step 516.

Next (at 518), the authorization module 208 generates an access key request to forward to the data source 106. The access key request includes the transient key received from the data source's authorization service and the client ID.

Upon receiving the access key request, if the authorization service of the data source determines that the client ID and transient key are valid, it generates an access key corresponding to the user and requesting entity (i.e., the TMS 102) and forwards this access key back to the authorization module 208 at step 520.

In turn, the authorization module 208 stores the access key against a particular user identifier and data source identifier at step 522 and forwards a success message to the authorization flow module 210. In embodiments where the authorization module 208 maintains containers for each data source, the access key is stored in the container corresponding to that particular data source against the user ID of the user that commenced the authorization process.

Once the access key is stored, the authorization flow module 210 generates and forwards an authentication success message to the table client (at step 524), which closes the pop-up window. Thereafter, the method 500 proceeds to step 414 of method 400, i.e., the client device generates and forwards a content request to the TMS 102.

As described in detail with respect to FIGS. 4A-4B, the request is then channeled from the invocation service 202 to the gateway module 206. The gateway module 206 retrieves the newly added access key for the user and the data source from the authorization module 208 and forwards this access key to the data source 106. The data source 106 determines the content that the user is allowed to access based on the received access keys and if it determines that there is restricted content that the user has access to, the data source 106 responds with a list of the permitted content.

The method depicted in FIG. 5 and described above assumes that the user provides the correct login details and consents to authorizing the TMS 102. In case the user login details are incorrect or the user does not consent, the authorization service of the data source 106 does not generate and forward the short duration identifier at step 514. Instead, it ends the authorization process by generating an error message, which is forwarded to the authorization flow module 210. The authorization flow module 210 in turn may display an error message in the pop-up window informing the client that the authorization process has failed. The pop-up window in this case may close and the table placeholder may display an error message.

The process so far describes the situation where the external content is restricted and not publicly available. However, in some cases, users may wish to reference external content that is publicly available (e.g., a Wikipedia page, the current stock exchange prices, a company website, etc.). In such cases, a simpler process may be adopted to retrieve content from the data source 106, without involvement of the authentication platform 103.

Figure 6:
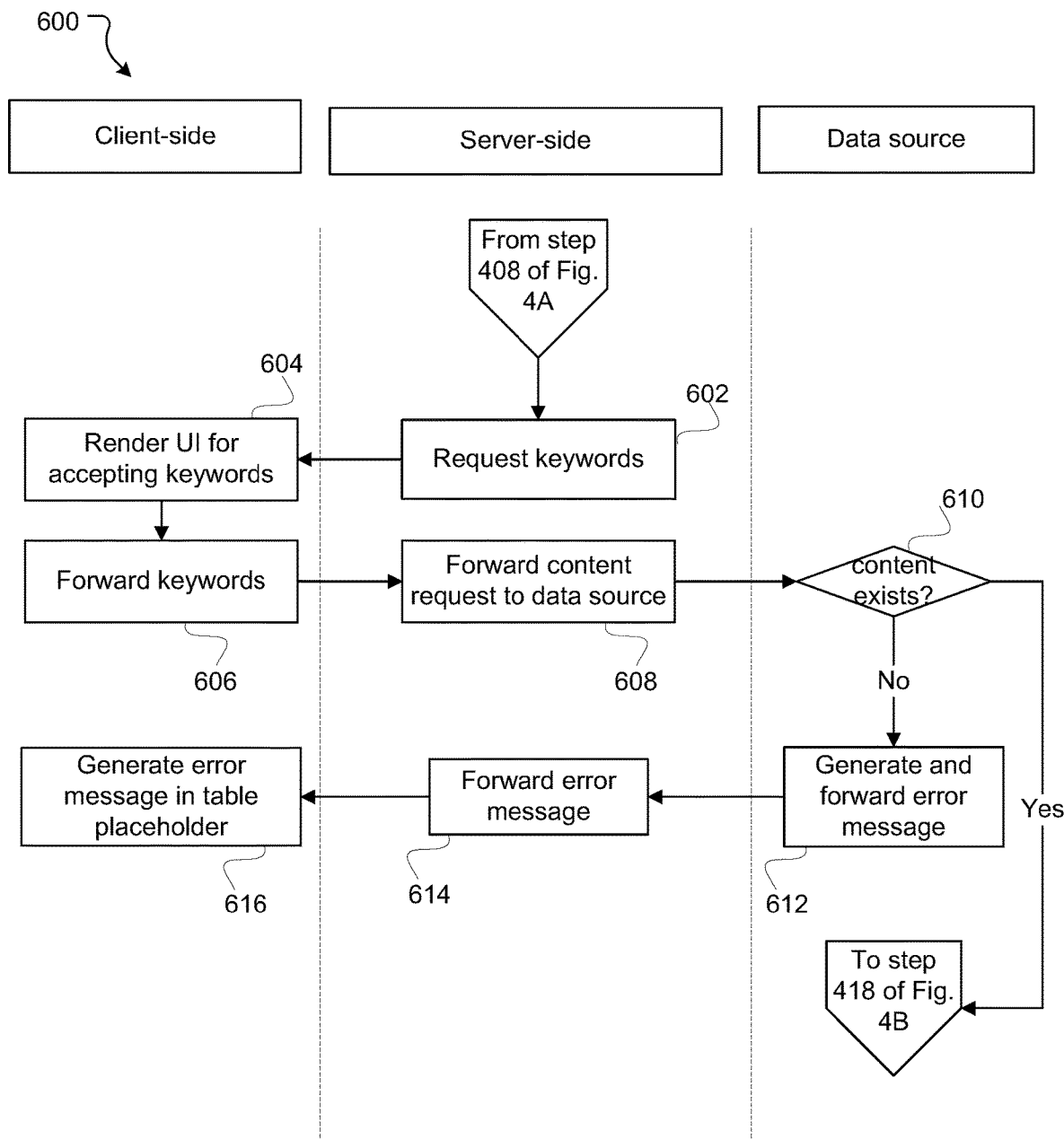
FIG. 6 is a flowchart illustrating an example method for retrieving content from a public data source according to some embodiments of the present disclosure.

This process is described with reference to FIG. 6. In particular, the process depicted in FIG. 6 illustrates the process performed after step 408 of method 400, when the invocation service 202 determines that the data source 106 is a public resource.

At step 602, the TMS 102 and in particular the invocation service 202, requests the user to input additional keywords for the content the user wishes to add into the table. To this end, the invocation service 202 generates a keyword request and forwards this to the table client 126. The table client 126 at step 604 generates a user interface for the user to input one or more keywords associated with the content the user wishes to utilize in the table. Once the user inputs the keywords, the table client 126 forwards these keywords to the invocation service at step 606. The invocation service in turn forwards a content request to the gateway module 206 to retrieve content from the associated data source. This request may include the keywords input by the user and the data source identifier of the corresponding data source (retrieved from the data source registry 204).

At step 608, the gateway module 206 generates and forwards a content request to the data source 106. This request includes the keywords for which content is required. In one example, the gateway module 206 may use an HTML POST message to forward the request to the data source 106.

As described previously, a data source 106 may provide a particular endpoint for servicing content requests from the TMS 102. This endpoint, also referred to as a resolve endpoint, is stored in the data source's descriptor in the data source registry 204. The gateway module 206 retrieves the resolve endpoint and forwards the content request to the resolve endpoint (which may point to the translation module 212 or an API of the data source).

At step 610, the data source 106 performs a search using the provided keywords and determines whether any content related to the provided keywords exists in the data source. If no content matching the keywords exists, an error message is generated and forwarded back to the gateway module 206 at step 612.

This error message is routed back to the invocation service 202 and the table client 126 at step 614. The table client 126 in turn displays an error message in the table placeholder at step 616 informing the user that no content related to the keywords can be found. The user may then refine the keywords or enter alternate keywords and try again.

If at step 610, it is determined that one or more content matching the keywords exist, the method proceeds to step 418 of FIG. 4B.

Methods 400-600 describe the process for retrieving content for a table when a user makes a selection to create a table in the content editor 124. When a user views content via client application 120, which already includes one or more tables, the process is slightly different. In this case, the table already exists within the content and the data fields and column types for each column is already selected. Accordingly, whenever the table is subsequently rendered on the display of the client device, the table client 126 generates a content request for the table content values. The content request includes identifiers of each of the data elements in the table. The data source then retrieves the current values for the identifiers and forwards these current values to the table client (via the TMS 102).

By using a two layer architecture in the TMS (i.e., an invocation service 202 that is configured to communicate with the client device 108 and a gateway module 206 that is configured to communicate with the data sources 106 and/or translation modules 212), the TMS 102 provides security. This is because the access keys are never shared with the invocation service 202 or the client device 108. Instead, the access keys are only ever shared between the gateway module 206 and the authorization module 208. Further, the invocation service 202 does not have direct access to the authorization module 208 and therefore cannot access the access keys stored in that authorization module 208. This way, even if a client application 120 is hacked, it is difficult for the client application 120 to retrieve access keys or other confidential information stored on the TMS 102.

Further, the table is generated in real time whenever the user views a page containing a connected table. This way, the data values depicted in the table is up to date.

The methods 400, 500 and 600 are described for tables that are refreshed every time they are rendered on a particular user device. However, as described previously, in some cases, when the table is created or edited, the table client 126 may display an option to disconnect the table from the data source(s) 106, such that the values in the table are not refreshed each time the table is rendered. In this case, once the user selects the disconnecting option, the value may be converted into plain text and embedded along with the remaining content on the page such that the methods described above are not activated when the page containing that information is rendered in the future.

As discussed above, once a table is created, the user may keep the table connected to external data source or disconnect the table from the external data source. If the table is connected to the data source, users may be able to change text formatting or column type, filter or sort the table, but not edit the content from the table. When the table is disconnected from the external source, all functions may be allowable.

In some embodiments, the functionality of selecting a column type for a particular column is provided through a column type selection affordance (such as a drop-down menu or a list). Further, the table system may refine the column type selections offered for a particular column based on the data field selected for that given type. In any event, once a column type is selected (e.g., by selecting the column type selection affordance), the table client 126 is configured to check whether the content entered in the column matches the selected column type. If the content entered does not match the column type, the table client 126 can either raise an alert, e.g., if the majority of content present in the column does not match the selected column type or delete cell values for the cell that include content that does not match the selected column type.

In certain embodiments, column types selected for a column of the table may be stored as part of a document state for the content in which the table is inserted. In one example, this is done by attached a block mark to each cell of the table.

Further, when new cells are added to a column, the new cells automatically carry the column type mark applied to previous cells in the column. Table A illustrates an example table cell document state with a column type block mark.

TABLE A example table cell document state with column type mark

```
{
"type": "tableCell",
"attrs": { },
"content": [
{
"type": "paragraph",
"content": [
{
"type": "text",
"text": "0.7"
}
]
}
],
marks: [
{
"type": "extensionMark",
"attrs": {
"extensionType": "com.atlassian.editor.table.column_type",
"extensionKey": "number"
}
}
]
}
```

Figure 7:
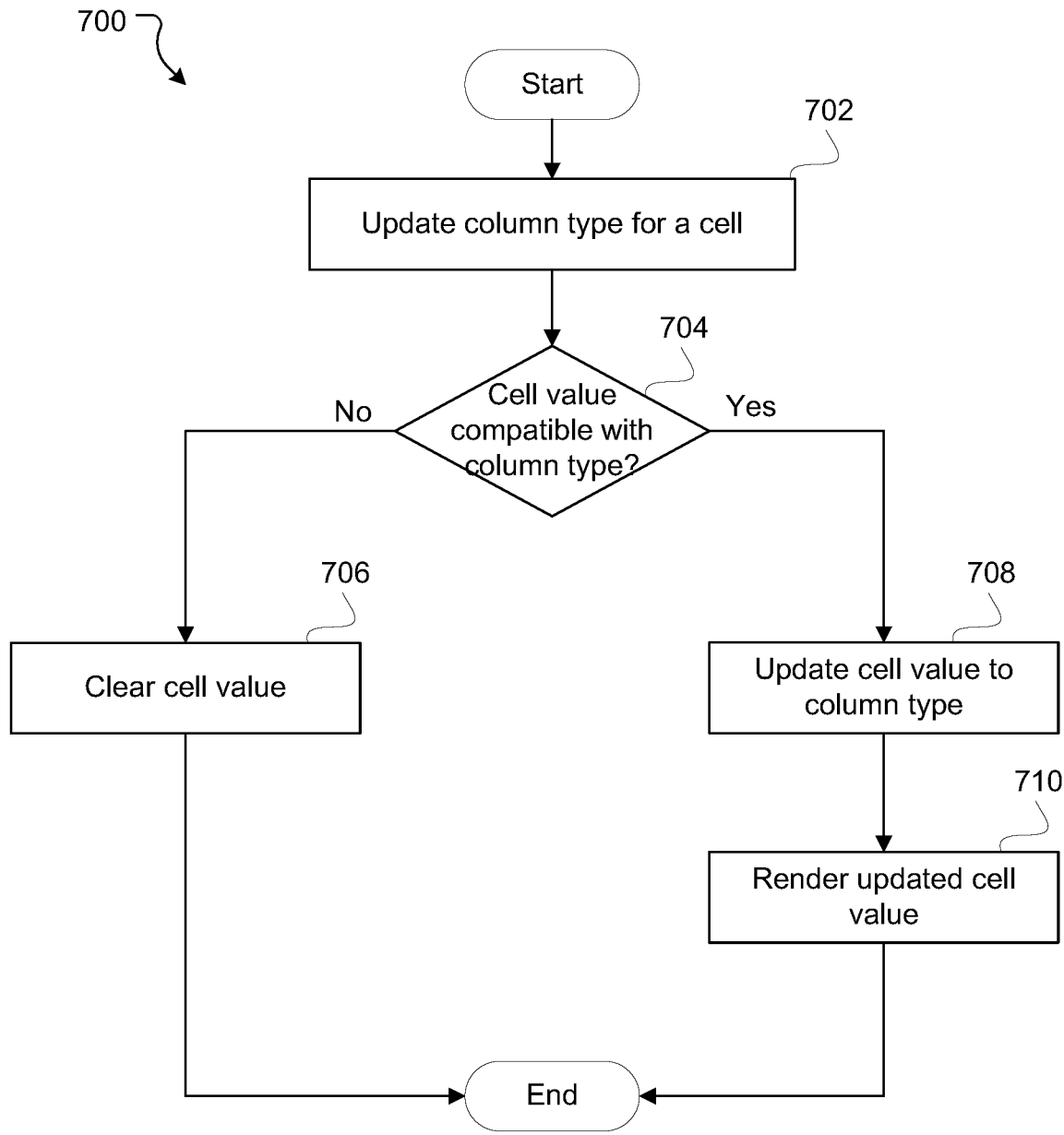
FIG. 7 is a flowchart illustrating an example method for editing a table according to some embodiments of the present disclosure.

FIG. 7 illustrates an example method 700 for updating column type in a cell in response to column type being updated for a column. The method commences at step 702, where the column type mark for the cell is updated. If the cell did not have any data, a new column type mark is created for the cell based on the column type selected by the user. Alternatively, if the cell already included data a column type mark would have already existed for the cell. In this case, the mark type is updated. For example the section "marks" in table A is updated.

Next, at step 704, the table application determines whether the cell value is compatible with the updated column type. In case the cell already includes a value, this step is performed immediately following step 702. Alternatively, if the cell does not include a value when the cell mark is updated, step 704 is performed once a data value is entered in the cell (which might happen at any time after the column type mark is updated).

In one example, the table client 126 compares the text or type of the table cell with the column type mark to make this determination. The text and/or type of the table cell can also be retrieved from the table cell state document. To determine whether the text and/or type of the table cell is compatible with the column type mark, the table application may store a compatibility table for the types of cell values that are compatible with each column type. For example, numbers cell value type may be compatible with a numbers and slider column type mark, whereas text cell value type may be compatible with a text and username column type.

At step 704, the table application client performs a lookup in the compatibility table to determine whether the cell value type is compatible with the column type. If a determination is made that the cell value is not compatible with the column type, the method proceeds to step 706 where the table client 126 clears the cell value and/or generates an alert to inform the user that the cell value is incompatible with the column type. The alert may be in the form of a visual error mark within the cell or in a pop-up window, in the form of an audio alert or a combination of the two.

Alternatively, if a determination is made that the cell value is compatible with the column type, the method proceeds to step 708 where the table client 126 converts the cell value to the updated column type if it was not already in that format. For example, if the cell value is a number and the updated column type is a slider, the number is converted into a corresponding indication on a slider scale. If the cell value is input in the column type format, no conversion is required and this step may be omitted.

Next, at step 710, the table client 126 renders the cell content with the user interface of the updated column type. For instance, following the example above, it renders the slider with the position of the slider corresponding to the original number value in the cell.

This process can be performed on each cell in a column when a column type is updated.

In this manner, the column type is applied to each cell in a column such that when a new value is entered in a cell, it is entered in the selected column type formatting for that cell. Otherwise, the value is deleted. For example, if the selected column type for a column is a checkbox, when a user selects a particular cell in that column, the user can set the value of the cell as an unchecked box or a checked box, but no other type of value. Similarly, if a date picker column type is selected for another column, whenever the user selects a cell in that column, the table client 126 displays a date picker control thereby allowing a user to enter a date in the column but no other type of value.

As described previously, the presently disclosed table system provides in-build customizable data summaries—i.e., techniques for summarizing data presented in a column of the table. In certain embodiments, the table client 126 provides a summary type selection affordance (e.g., a menu) for at least one column in the table. The summary type selection affordance and corresponding menu for different columns may be different and it is based on the data field and column type selected for a particular column. To this end, the table client may store a summary database that stores relations between different data field types and column types and corresponding summary options. Then based on the data field type and column type for a particular column, the table client performs a lookup in the summary database to retrieve the possible summary options for that combination of data field type and column type. For example, for a "number" data field type which is also represented as a "number" column type, the table client may offer mathematical operations such as sum, average, median, min, max, range, standard deviation, etc., in the summary menu, whereas for a "date" data field and column type, the table client 126 offers date operations such as date ranges, earliest date, latest date, etc., in the summary menu.

Once a particular summary is selected from the summary type selection affordance, the table client performs the associated function on the cells of the particular column to generate the summary and render the summary in a selected cell of the table. In another embodiment, a dedicated summary row is added in the table when the table is created. This summary row is added at the bottom of the table. As more cells/rows are added in the table to add content, the summary row is moved downward such that it is the last row of the table. In case a dedicated row is provided, for each cell in the summary row, the table client determines the summary function to display in the summary menu based on the data field and column type for the column in which the summary cell is located.

Processes 400-600 describe methods for creating tables based on data retrieved from data sources. In other embodiments, users may utilize the table client 126 to create tables locally. In this case, a user may select an affordance displayed in the editor 124 for creating a local table. The user may provide a number of columns and/or rows for the table at this stage. The table client 126 may then create and render an empty table for the user to populate. The empty table includes a column type selection menu for each column of the table and a summary row at the end of the table. As data is not retrieved from any data source in such cases, there is no data field selection required. Instead, for each column, the user may select a column type, which is then factored in for creating a summary menu for each summary cell in the summary row of the table.

The methods described above clearly distinguish between the functionality of the server-side components (i.e., the TMS 102 and the authentication platform 103) and client-side components of the dynamic element management system. However, in some cases, some of the functions that are described as being performed by the table client 126 may be performed by the TMS 102 vice versa. For example, in some cases, the table client may be a thin client configured to only send requests and render dynamic elements. In this case the functionality of converting the data file into graphical control objects may be performed at the server and the server may send data to render the visual objects to the client. In other cases, the table client 126 may be configured to perform one or more of the TMS 102 functions itself.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for creating a table, the method comprising:
   receiving a request to create a table, the request including an indication of a number of columns and a number of rows for the table,
   generating the table, the table comprising the number of columns and the number of rows indicated in the request, an intersection of a column and a row in the table being a cell of the table, the table further comprising a summary row;
   rendering the table for display on a user interface of a client device, the table comprising a column type selection affordance for selecting a column type for at least one column rendered in the table and a summary type selection affordance for selecting a summary type for the at least one column rendered in the table; and
   in response to receiving user input at the column type selection affordance, change the column type from a first column type to a second column type:
      evaluating cell values of cells in the column for compatibility with the second column type;
      in response to a first cell value being compatible with the second column type, rendering an updated cell value in accordance with the second column type;
      in response to a second cell value being incompatible with the second column type, omitting the second cell value from a subsequent summary calculation in a respective cell of the summary row;
      changing the summary type from a first summary type to a second summary type for a respective cell of the summary row;
      computing a summary value for the respective cell of the summary row in accordance with the second summary type; and
      causing display of the summary value in the respective cell of the summary row.

2. The computer-implemented method of claim 1, further comprising:
   upon determining that a value in a second cell of the column is incompatible with the second column type:
      clearing the value of the second cell; and
      causing display of an alert configured to inform the user that the second cell value is incompatible with the column type .

3. The computer-implemented method of claim 1 further comprising retrieving data for the table from a data source.

4. The computer-implemented method of claim 3 comprising:
   receiving a content request, the content request comprising a user identifier of a user creating the table, a data source identifier of a data source from which to retrieve content for the table, and a content item identifier of a content item hosted on the data source;
   communicating the content request to the data source, receiving data from the content item; and
   forwarding the data from the content item to the client device for rendering the data in the table.

5. The computer-implemented method of claim 4, further comprising maintaining a list of data source descriptors for supported data sources, each data source descriptor comprising a data source identifier, data indicating whether the data source has restricted access or public access, and a resolve endpoint pointing to a location that can be addressed for forwarding the content request to the data source.

6. The computer-implemented method of claim 5, wherein communicating the content request to the data source further comprises: identifying the resolve endpoint for the data source from the data source descriptor for the data source; and
   forwarding the content request to a location pointed by the resolve endpoint.

7. The computer-implemented method of claim 6, further comprising:
   determining whether the data source is a restricted data source, the determination made by checking the data indicating whether the data source has restricted access or public access,
   upon determining that the data source is a restricted data source, determining whether an access key corresponding to the user identifier of the user creating the table and the data source is stored in an authentication platform;
   upon determining that the access key is stored on the authentication platform, retrieving the access key from the authentication platform; and
   forwarding the access key along with the content request to the data source.

8. The computer-implemented method of claim 6, further comprising:
   determining whether the data source is a restricted data source, the determination made by checking the data indicating whether the data source has restricted access or public access,
   upon determining that the data source is a restricted data source, determining whether an access key corresponding to the user identifier of the user creating the table and the data source is stored in an authentication platform; and
   upon determining that the access key is not stored on the authentication platform:
      generating and forwarding an error message to the client device and initiating an authorization process with the data source to generate the access key for the user creating the table and the data source.

9. The computer-implemented method of claim 4, wherein multiple data fields are received and forwarded to the client device, and the table includes a graphical control element that allows the user to select a data field for a column of the table.

10. The computer-implemented method of claim 4, further comprising:
    receiving a table request from the client device, the table request comprising the user identifier of the user creating the table and the data source identifier;
    communicating the table request to the data source corresponding to the data source identifier;
    receiving a list of content items from the data source that the user creating the table has access to, the list comprising content items identifiers for each of the content items; and
    rendering the list of content items on a display of the client device for the user creating the table to select.

11. A non-transitory computer readable medium comprising instructions which when executed by a processor cause the processor to perform the steps of:
    receiving a request to create a table, the request including an indication of a number of columns and a number of rows for the table,
    generating the table, the table comprising the number of columns and the number of rows indicated in the request, an intersection of a column and a row in the table being a cell of the table, the table further comprising a summary row;

rendering the table for display on a user interface of a client device, the table comprising a column type selection affordance for selecting a column type for at least one column rendered in the table and a summary type selection affordance for selecting a summary type for the at least one column rendered in the table;

in response to receiving user input provided to the column type selection affordance, change the column type from a first column type to a second column type:
  evaluating cell values of cells in the column for compatibility with the second column type;
  in response to a first cell value being compatible with the second column type, rendering an updated cell value in accordance with the second column type;
  in response to a second cell value being incompatible with the second column type, omitting the second cell value from a subsequent summary calculation in a respective cell of the summary row;
  updating the summary type from a first summary type to a second summary type for a respective cell of the summary row;
  computing a summary value for the respective cell of the summary row in accordance with the second summary type; and
  causing display of the summary value in the respective cell of the summary row.

12. The non-transitory computer readable medium of claim 11, further comprising instructions which when executed by the processor cause the processor to perform the steps of:
  upon determining that a value in a second cell of the column is not compatible with the second column type:
    clearing the value of the second cell; and
    causing display of an alert configured to inform the user that the second cell value is incompatible with the column type.

13. The non-transitory computer readable medium of claim 11, further comprising instructions which when executed by the processor cause the processor to retrieve data for the table from a data source.

14. The non-transitory computer readable medium of claim 13, further comprising instructions which when executed by the processor cause the processor to:
  receive a content request, the content request comprising a user identifier of a user creating the table, a data source identifier of a data source from which to retrieve content for the table, and a content item identifier of a content item hosted on the data source;
  communicate the content request to the data source,
  receive data from the content item; and
  forward the data from the content item to the client device for rendering the data in the table.

15. The non-transitory computer readable medium of claim 14, further comprising instructions which when executed by the processor cause the processor to maintain a list of data source descriptors for supported data sources, each data source descriptor comprising a data source identifier, data indicating whether the data source has restricted access or public access, and a resolve endpoint pointing to a location that can be addressed for forwarding the content request to the data source.

16. The non-transitory computer readable medium of claim 15, wherein communicating the content request to the data source further comprises:
  identifying the resolve endpoint for the data source from the data source descriptor for the data source; and
  forwarding the content request to a location pointed by the resolve endpoint.

17. The non-transitory computer readable medium of claim 16, further comprising instructions which when executed by the processor cause the processor to:
  determine whether the data source is a restricted data source, the determination made by checking the data indicating whether the data source has restricted access or public access,
  upon determining that the data source is a restricted data source, determine whether an access key corresponding to the user identifier of the user creating the table and the data source is stored in an authentication platform;
  upon determining that the access key is stored on the authentication platform, retrieve the access key from the authentication platform; and
  forward the access key along with the content request to the data source.

18. The non-transitory computer readable medium of claim 16, further comprising instructions which when executed by the processor cause the processor to:
  determine whether the data source is a restricted data source, the determination made by checking the data indicating whether the data source has restricted access or public access,
  upon determining that the data source is a restricted data source, determine whether an access key corresponding to the user identifier of the user creating the table and the data source is stored in an authentication platform; and
  upon determining that the access key is not stored on the authentication platform:
    generate and forward an error message to the client device and initiating an authorization process with the data source to generate the access key for the user creating the table and the data source.

19. The non-transitory computer readable medium of claim 14, wherein multiple data fields are received and forwarded to the client device, and the table includes a graphical control element that allows the user to select a data field for a column of the table.

20. The non-transitory computer readable medium of claim 14, further comprising instructions which when executed by the processor cause the processor to:
  receive a table request from the client device, the table request comprising the user identifier of the user creating the table and the data source identifier;
  communicate the table request to the data source corresponding to the data source identifier;
  receive a list of content items from the data source that the user creating the table has access to, the list comprising content items identifiers for each of the content items; and
  render the list of content items on a display of the client device for the user creating the table to select.

* * * * *